United States Patent [19]
Locke et al.

[11] Patent Number: 6,021,178
[45] Date of Patent: Feb. 1, 2000

[54] SYSTEM AND METHOD FOR DETECTING TYPES OF SIGNALS IN MESSAGING SYSTEMS

[75] Inventors: Michael E. Locke, Santa Clara; Daniel T. Lai, Los Altos, both of Calif.

[73] Assignee: Siemens Information and Communication Networks, Inc., Boca Raton, Fla.

[21] Appl. No.: 08/906,302

[22] Filed: Aug. 5, 1997

[51] Int. Cl.[7] .................................................. H04M 11/00
[52] U.S. Cl. ..................... 379/52; 379/90.01; 379/88.08
[58] Field of Search .................... 379/52, 90.01, 379/93.01, 93.09, 93.11, 93.17, 93.24, 100.01, 88.07, 88.08, 88.13, 88.14; 355/412, 413, 414, 445

[56] References Cited

U.S. PATENT DOCUMENTS 5,396,536  3/1995  Yudkowsky et al. ....................... 379/52
5,416,836  5/1995  Marinelli et al. ......................... 379/377
5,530,740  6/1996  Irribarren et al. ...................... 379/93.24

*Primary Examiner*—Curtis A. Kuntz
*Assistant Examiner*—Melur Ramakrishnaiah
*Attorney, Agent, or Firm*—Heather S. Vance

[57] ABSTRACT

A system and a method are provided for detecting a type of a received signal. The system includes a processor (32) and two receivers (24, 26). Both receivers (24, 26) are coupled to the processor (32). The first receiver (26) is capable of receiving a first signal type, and the second receiver (24) is capable of receiving a second signal type. An algorithm (30), coupled to the second receiver (24), is used for distinguishing between the first signal type and the second signal type. The algorithm (30) is used after the first receiver (26) begins storing the signal as a first signal type, and after the second receiver (24) begins storing the signal as a second signal type. At least one of the two signal types is retained.

23 Claims, 3 Drawing Sheets

SYSTEM AND METHOD FOR DETECTING TYPES OF SIGNALS IN MESSAGING SYSTEMS

BACKGROUND OF THE INVENTION

1. Field of the Invention

The invention relates to detecting certain types of signals in messaging systems, and more particularly to a system and a method for detecting telecommunication signals for the deaf in messaging systems.

2. Description of the Related Art

Presently, signals from telecommunication devices for the deaf (TDD) can be sent via regular telephone lines. These TDD signals can be directed to currently available voice messaging systems which store the sound of the TDD modem transmission. This sound can later be used to create a text display with the TDD message. Unfortunately, sound recordings of the TDD modem transmission use a lot of disk storage space in the receiving device's memory. For example, with a 16 kbps speech compression rate voice message system, a 30 second TDD transmission can take up to 60 k bytes to store a message. In comparison, using the common TDD transmission rate of 45.5 baud, a 30 second TDD transmission contains no more than 182 characters. Thus, storage of the characters rather than the sound recordings requires much less disk storage space. Moreover, if multiple forwarding is needed for a sound recorded TDD message, the signal quality of the sound recording is degraded by additional line distortion and multiple steps of speech compression. Even when forwarding is not involved, simply recording and playing back a TDD message leads to line degradation which occurs twice. If both of the lines are of poor quality, the resultant signal may be received incorrectly.

Alternatively, different telephone access numbers can be used for TDD signals and voice signals. In this arrangement, calls to the TDD access number are stored in TDD mode (usually as text), and calls to the voice access number are stored in voice mode (as sound recordings). In another arrangement, an additional signal, such as a dual-tone multi-frequency (DTMF) tone, is used to indicate to the messaging system that a TDD recording is desired. This additional signal is undesirable because some TDDs, particularly those built into computers, cannot generate the necessary signal. Thus, in these arrangements, the user sending the TDD signal must notify the receiving system about the TDD transmission before or when the TDD signal is sent. In systems that use different telephone access numbers, no mixed mode recording can be done. Additionally, more administration is needed to manage additional access numbers. Also, this type of system must be set up in advance and multiple access numbers issued.

Automated discriminators discriminate between signals from TDD and voice signals. These discriminators have several drawbacks. For example, if a TDD text transmission is received by a messaging system, the discriminator must quickly determine if the signal is a TDD signal. When the determination is not made fast enough, some of the TDD transmitted characters are lost. In addition, a human voice can mimic the sound of a TDD modem for a brief period of time. Such a voice signal can easily fool a fast discriminator into switching to the TDD mode when a voice recording is desired.

What is needed is a system which avoids losing TDD data during any TDD data transmission while also reliably storing voice data as sound recordings. It is also desirable to reduce the storage requirements for a TDD message stored by a messaging system which can also store voice messages. Furthermore, it is desirable to have a system which does not require the user to first notify the system that a TDD data transmission will be sent. Also, additional access numbers are undesirable. Finally, it is desirable to have a system and a method which have a minimal impact to the user interface of a regular messaging system.

SUMMARY OF THE INVENTION

According to the invention, a system and a method are provided for detecting a type of a received signal. The system includes a processor and two receivers. Both receivers are coupled to the processor. The first receiver is capable of receiving a first signal type, and the second receiver is capable of receiving a second signal type. A program is stored in a memory, such as a hard drive, accessible to the processor, which is coupled to the second receiver. The program implements an algorithm used to distinguish between the first signal type and the second signal type. The algorithm is used after the first receiver begins storing the signal as a first signal type, and after the second receiver begins storing the signal as a second signal type. At least one of the two signal types is retained.

DETAILED DESCRIPTION

The present invention provides a system and a method for automatically discriminating TDD data signals from multimedia signals so that TDD data messages are stored as text while multimedia messages are stored as multimedia data. Thus, the user does not need to first notify the receiving system regarding the type of message being sent. In one embodiment of the invention, the data signals are from telecommunication devices for the deaf (TDD). The data signals can also originate from, for example, anticipated devices which work similarly to TDDs. In the preferred embodiment of the invention, the TDD data signals are stored as text. These text messages can be relayed/displayed on e-mail, facsimile, word processors, voice prompt devices and any other TDDs. The multimedia signal can include any type of multimedia data such as voice data, video data, facsimile data and the like. In the examples of the preferred embodiments below, TDD signals and voice signals are primarily used. As stated above, any type of data signal or multimedia signal can be received and processed by the present invention. Thus, the present invention is not limited to TDD signals and/or voice signals.

When a call is received by a voice message system or by the voice portion of a multimedia message system, the message system typically plays a user voice/TDD greeting. A beep is then played to notify the caller to start recording a message. The present invention starts storing the received message as both a voice recording and a TDD reception. A decision is later made to choose which stream of stored data to keep.

Figure 1:
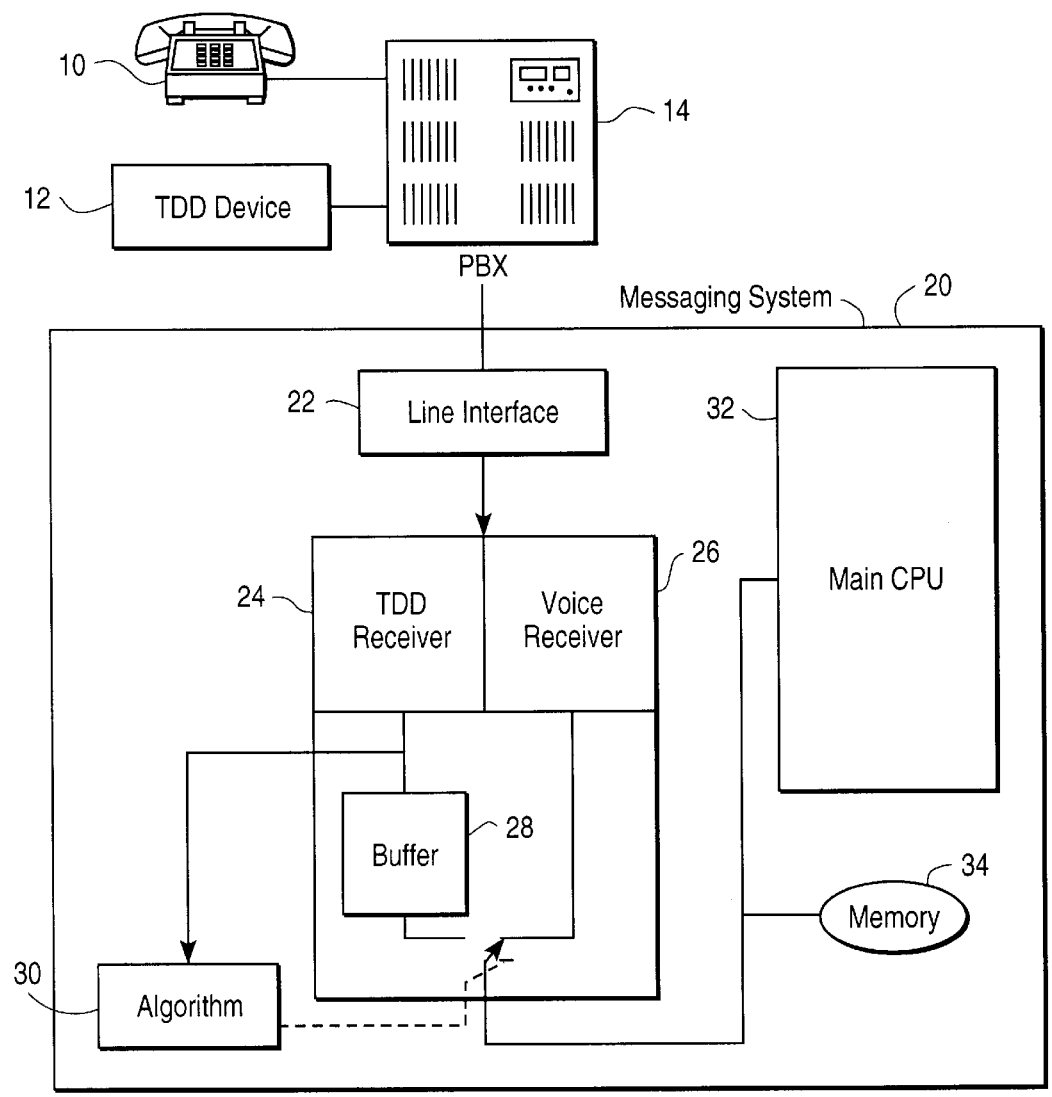
FIG. 1 illustrates an example of an environment for the present invention as well as the present invention.

FIG. 1 illustrates an example of an environment for the present invention as well as the present invention. In this example, both telephone 10 and TDD device 12 are coupled to telephone switch 14. Telephone switch 14 can be, for example, a private branch exchange (PBX) or a central office switch. Telephone switch 14 is coupled to messaging system 20, and more particularly to TDD receiver 24 and voice receiver 26 via line interface 22. TDD receiver is coupled to data buffer 28 and memory 34 containing a program implementing algorithm 30. Messaging system 20 also contains main central processing unit 32 and memory 34. As set forth above, when messaging system 20 receives a call, both TDD receiver 24 and voice receiver 26 are initiated. TDD receiver 24 attempts to receive TDD modem transmissions and buffers the TDD text characters in buffer 28. Voice receiver 26 compresses the received signal and stores it as a conventional voice recording in memory 34.

In the preferred embodiment, algorithm 30 includes a measurement of the probability that the signal is a voice message and a measurement of the probability that the signal is text data. These probabilities are compared to predetermined threshold numbers to determine whether the message is most likely a voice message or a text data message. As an alternative, algorithm 30 can include a decision algorithm. For example, the decision algorithm could be a threshold of a minimum time of continuous detection of a text signal in the range of 1400 to 1800 Hz. If the number of TDD text characters received without error exceeds the predetermined threshold, the receiving, compressing and storing done by voice receiver 26 is terminated while the entire TDD text message is received by TDD receiver 24 and stored in memory 34. Thus, algorithm 30 can switch the data stream received by memory 34 such that memory 34 receives data from buffer 28 rather than voice receiver 26 when a TDD data signal is detected. The previously stored compressed voice recording of the TDD text message is deleted from memory 34 and replaced with the portion of the TDD text message in buffer 28. After the storing of the TDD text message is complete, the message can be output with speech synthesis or by a TDD transmitter.

In an alternative embodiment of the present invention, the receiving, compressing and storing done by voice receiver 26 is not terminated after the signal is identified as a TDD text message. After the full TDD text message is received and stored, the compressed voice recording of the TDD text message is automatically deleted from memory 34. Therefore, the deleting of the compressed and stored voice recording can occur at any time after the signal is identified as a TDD text transmission. Furthermore, a switch over to exclusive TDD text reception does not have to be made quickly. This switch over can occur as late as after the end of reception of the signal. A voice message is reliably stored as a voice recording, and a TDD text message is reliably stored as text without loss of text because the received signal/message can be monitored for a long time before any switch over occurs.

Figure 2:
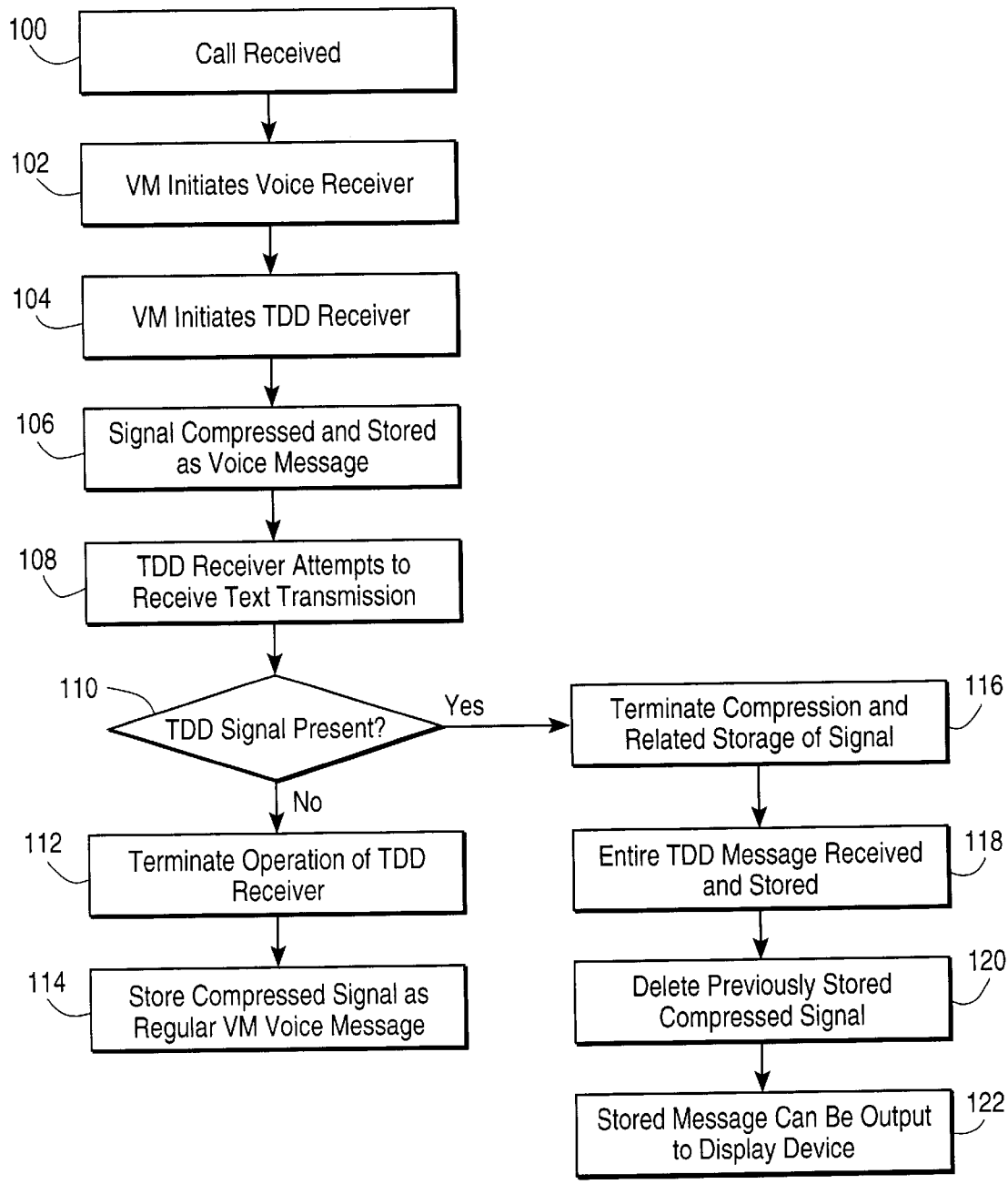
FIG. 2 is a process flowchart for a first embodiment of the present invention.

FIG. 2 is a process flowchart for a first embodiment of the present invention. At step 100, a multimedia call (e.g., a telephone call) is received by the system. At step 102, the messaging system (e.g., a voice mail messaging system) initiates the multimedia (e.g., voice) receiver. At step 104, the messaging system initiates the data (e.g., TDD) receiver. Steps 102 and 104 can occur simultaneously or in reverse order, as long as both voice receiver and TDD receiver are initiated. At step 106, the received signal from the call is compressed and stored as a voice message by the voice receiver. At step 108, the TDD receiver attempts to receive the signal from the call as a text character transmission. Again, steps 106 and 108 can occur simultaneously or in reverse order, as long as both a voice message and a text message are received. In the preferred embodiment, the received signal is stored as a voice message in the messaging system's memory, and the received signal is temporarily stored as a TDD text message in a buffer.

At step 110, the system uses an algorithm to determine if the signal from the call is a data signal containing a TDD text message. If the signal is not a data signal containing a text message, operation of the TDD receiver is terminated at step 112. At step 114, the message compressed and stored by the voice receiver is stored as a regular voice mail message. If the signal is a data signal containing a TDD text message, the compression and storage of the signal as a voice recording is terminated at step 116. At step 118, the entire data message is received and stored by the TDD receiver. In the preferred embodiment, the portion of the TDD message temporarily stored in the buffer is transferred to the messaging system's memory, and the remaining portion of the TDD message, if any, is directly stored in the messaging system's memory. At step 120, the previously stored compressed voice recording is deleted. At step 122, the stored TDD message can be output to a display device (e.g., an e-mail system, a facsimile, a word processor display, a voice prompt device or a TDD).

Figure 3:
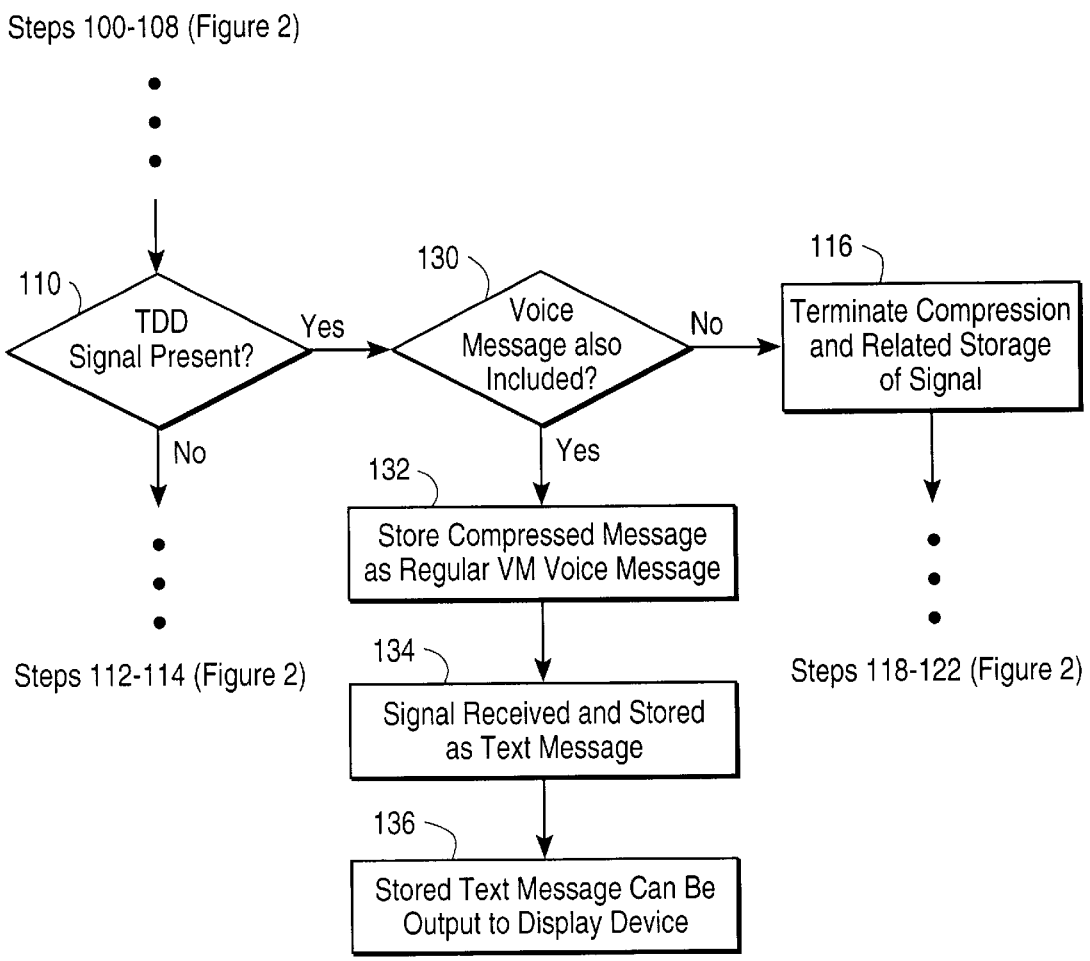
FIG. 3 is a process flowchart for a second embodiment of the present invention.

FIG. 3 is a process flowchart for a second embodiment of the present invention. FIG. 3 begins with steps 100–114 as set forth in FIG. 2 and the related description. At step 130, when a data signal containing a TDD text message is detected, the system checks if a voice message is also included. If a voice message is not included, the system goes through steps 116–122 as set forth in FIG. 2 and the related description. If a voice message is also included in the signal, the system moves to step 132. The message is then stored as a multi part message with each part being only one type (e.g., voice or text).

A data signal which includes both a TDD text message and a voice message can be referred to as a signal including a mixed mode message. For example, an application could be a TDD message that has a voice announcement. In this example, the system saves the voice announcement from the TDD message as a voice and also process the TDD message as text. At step 132, the voice part of the signal is compressed and stored by the voice receiver as a regular voice mail message. At step 134, the text part of the signal is received and stored by TDD receiver as a text message. At step 136, the stored text message can be output to a display device.

Thus, in this embodiment of the invention, both the voice receiver and the TDD receiver are used for mixed mode storage of the message without losing any portion of the message. During playback, the system can output the two different parts of the message at different times, or the system can output only the part of the message which is compatible with the output device. For example, a telephone output device would be sent the voice portion of a message, and a terminal output device would be sent the TDD text portion of the message. In the preferred embodiment, the system could automatically check which type of output device was present by communicating with the output device, or the user could manually input the type of output device.

The present invention can be extended beyond a store and forward messaging system. For example, the invention can be used in a transmission system where the bandwidth required for transmitting a TDD message can be significantly reduced if the transmission system can determine that the transmitting message is a TDD message. In this example, the invention can be implemented such that the TDD modem transmission is sent at the beginning of the transmitted message. During the TDD modem transmission, a decision can be made as to whether and when to switch to exclusively transmitting text. Since TDD transmission is usually asynchronous, half-duplex and without a continuous carrier when no data is being transmitted, there are many opportunities for switching to the transmission of text. This can be used over leased lines (e.g., a T1 line) with conventional configurations.

Furthermore, the present invention can be used to assist in the transmission of other signals when there is no inherent setup protocol preceding the signals. In this example, the proper mode of recording and/or reception is not known until the transmission has started. In present systems, the signal is usually initially received and stored as a default type of signal. If the default is incorrect, it is difficult (if not impossible) to make a mode switch without losing the beginning of the transmission. By using multiple receivers in parallel, the present invention avoids any signal loss.

We claim:

1. A messaging system coupled to a switch, the messaging system receiving an incoming signal and including:
   a processor;
   a first signal receiver coupled to the processor, the first signal receiver processing the incoming signal into a first transformed signal;
   first storage for storing the first transformed signal;
   a second signal receiver coupled to the processor, the second signal receiver processing the incoming signal into a second transformed signal; and
   second storage for storing the second transformed signal,
   in which a program runs in the processor coupled to the second signal receiver, the program evaluating the quality of the second transformed signal according to predetermined criteria after the first storage and the second store begin storing the signal, and further
   wherein if the predetermined criteria are met, the entire second signal is stored in the messaging system.

2. The messaging system of claim 1, wherein the processing by the first receiver and the first storage are suitable for voice signals.

3. The messaging system of claim 1, wherein the processing by the second receiver and the second storage are suitable for a signal from a telecommunications device for the deaf.

4. The messaging system of claim 1, wherein the second storage stores the second transformed signal as text.

5. The messaging of claim 4, wherein the text can be viewed as at least one of an e-mail system, a facsimile, a word processor display, a voice prompt device and a telecommunication device for the deaf.

6. The messaging system of claim 1, wherein the evaluating includes a measurement of a probability that the signal is the voice signal and a measurement of a probability that the signal is a text signal, each of the measurements being compared to predetermined threshold numbers such that the predetermined threshold numbers are used to determine how the signal is stored.

7. The messaging system of claim 1, wherein the evaluating includes a decision algorithm used to determine whether the multimedia signal or the data signal is stored, the decision algorithm containing a threshold of a minimum time of continuous detection of the second transformed signal.

8. The messaging system of claim 1, wherein both the entire first transformed signal and the entire second transformed signal are stored.

9. A method for storing an incoming signal, comprising the steps of:
   initializing first signal receiver for processing the incoming signal into a first transformed signal;
   initializing a second signal receiver for processing the incoming signal into a second transformed signal;
   the first signal receiver receiving the incoming signal and processing the incoming signal into a first transformed signal;
   storing the first transformed signal in a first storage;
   the second signal receiver receiving the incoming signal and processing the incoming signal into a second transformed signal;
   storing the second transformed signal in a second storage;
   evaluating the quality of the second transformed signal according to predetermined criteria; and
   continuing to receive and store the second transformed signal if the predetermined criteria are met.

10. The method for storing an incoming signal of claim 9, further comprising the step of compressing and storing the signal as a voice signal if the predetermined criteria are not met, the call being stored as a voice recording.

11. The method for storing an incoming signal of claim 9, further comprising the step of outputting the second transformed signal to a display device.

12. The method for storing an incoming signal of claim 9, further comprising the steps of:
   terminating the storing of the first transformed signal if the predetermined criteria are met; and
   deleting data previously stored as first transformed signal if the predetermined criteria are met.

13. The method for storing an incoming signal of claim 9, further comprising the step of terminating the storing of the second transformed signal if the predetermined criteria are not met.

14. The method for storing an incoming signal of claim 9, wherein the predetermined criteria include comparing a measurement of probability that the signal is compatible with processing by the first signal receiver with a measurement of the probability that the signal is compatible with processing by the second signal receiver.

15. The method for storing an incoming signal of claim 9, wherein the first transformed signal is stored as a voice signal.

16. The method for storing an incoming signal of claim 9, wherein the second transformed signal is stored as a TDD.

17. A messaging system for receiving an incoming signal comprising:
   a processor;
   a first signal receiver coupled to the processor, the first signal receiver processing the incoming signal into a first transformed signal;
   a second signal receiver coupled to the processor, the second signal receiver processing the incoming signal into a second transformed signal; and
   storage for storing both the first transformed signal and the second transformed signal,
   in which a program runs in the processor coupled to the second receiver, the program evaluating the quality of the first transformed signal and the second transformed signal according to predetermined criteria, after the storage begins storing the incoming signal as a first transformed signal and as a second transformed signal, and further wherein at least one of the entire first transformed signal and the entire second transformed signal type is stored.

18. The messaging system of claim 17, wherein the predetermined criteria include comparing a measurement of probability that the signal is compatible with processing by the first signal receiver with a measurement of the probability that the signal is compatible with processing by the second signal receiver such that the predetermined criteria are used to determine which of the entire first transformed signal and the entire second transformed signal is stored.

19. The messaging system of claim 17, wherein the program implements a decision algorithm to determine which one of the entire first transformed signal and the entire second transformed signal is stored, the decision algorithm containing a threshold of a minimum time of continuous detection of the second transformed signal type.

20. The system of claim 19 wherein the threshold includes a prespecified signal strength.

21. The system of claim 19 wherein the threshold includes a prespecified frequency band.

22. The system of claim 21 wherein the frequency band is in the range of 1400 to 1800 Hz.

23. The system of claim 17 in which the storage stores multimedia messages.

* * * * *